Feb. 8, 1966    H. MERKER ETAL    3,233,850
CHAIN-LIKE DEVICE FOR GUIDING ELECTRIC CABLES AND THE LIKE
Filed Jan. 4, 1962    2 Sheets-Sheet 1
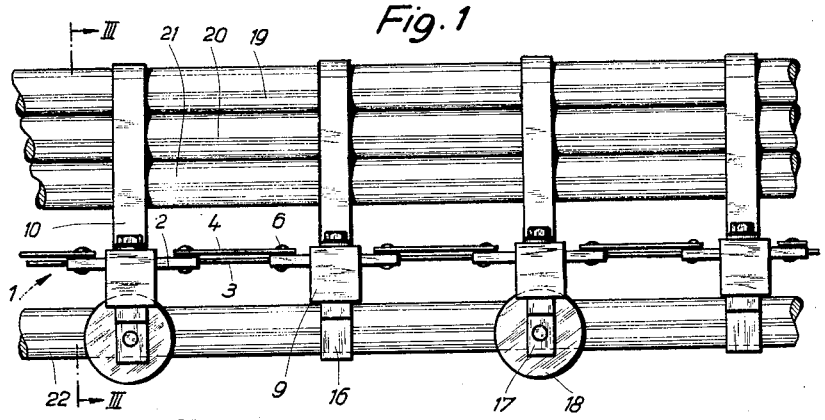
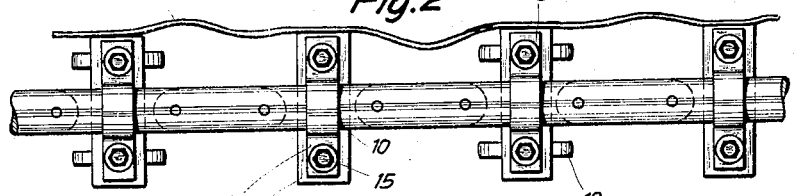
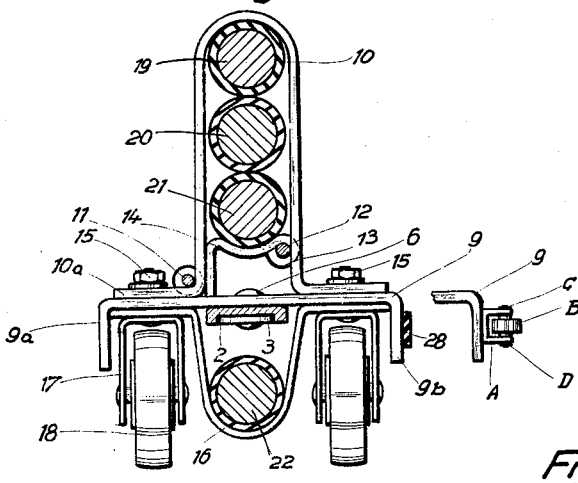
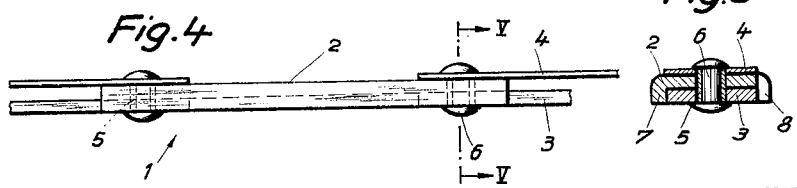
INVENTORS:
Herbert Merker
Kurt Loos
BY Feb. 8, 1966         H. MERKER ETAL         3,233,850
CHAIN-LIKE DEVICE FOR GUIDING ELECTRIC CABLES AND THE LIKE
Filed Jan. 4, 1962         2 Sheets-Sheet 2
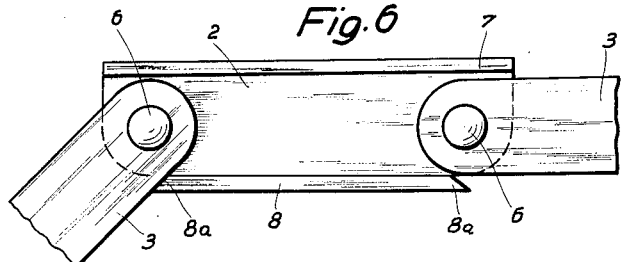
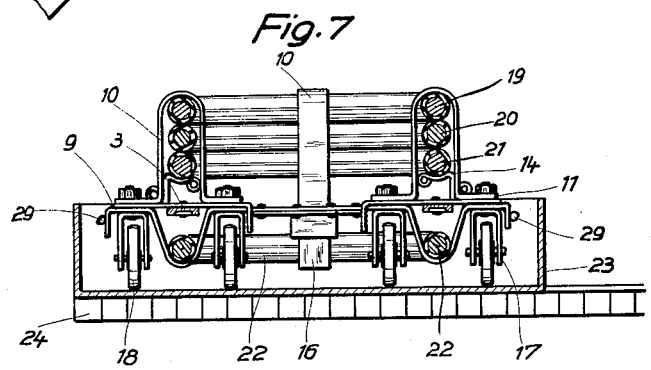
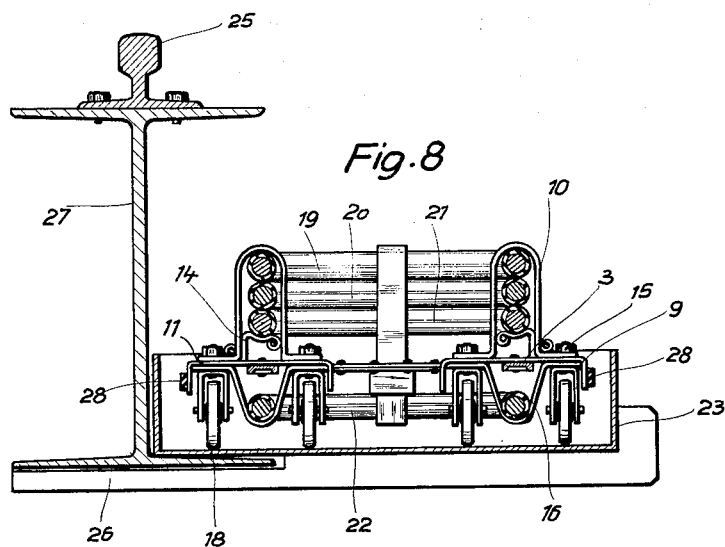
INVENTORS:
Herbert Merker
Kurt Loos
BY з,233,850
CHAIN-LIKE DEVICE FOR GUIDING ELECTRIC
CABLES AND THE LIKE
Herbert Merker, Siegen, Westphalia, and Kurt Loos,
Dreis-Tiefenbach, Germany, assignors to Kabelschlepp
G.m.b.H., Siegen, Westphalia, Germany
Filed Jan. 4, 1962, Ser. No. 164,233
Claims priority, application Germany, Jan. 5, 1961,
K 42,578
4 Claims. (Cl. 248—49)

The present invention relates to a device for guiding cables or the like, and in particular concerns a chain-like device for guiding especially electric cables from a stationary connection to a movable consumer, as for instance a crane movable on rails. It is, however, to be understood that the arrangement according to the present invention is not limited to the guiding and transporting of cables but may also be used for similarly shaped articles such as hoses for feeding water or pressure fluid to consumers. The heretofore known devices of the type involved are rather complicated in construction and therefore are expensive and require complicated guiding means.

It is, therefore, an object of the present invention to provide a guiding device of the above mentioned type, which will overcome the drawbacks listed above.

It is another object of this invention to provide a supporting and guiding device for flexible elements such as electric cables, hoses or the like, which can be made by relatively simple means and can be moved without requiring undue power while on the other hand requiring relatively small space.

It is a further object of this invention to provide a guiding device as set forth in the preceding paragraphs, in which the cables, hoses or the like can easily and readily be connected to and disconnected from the respective device.

These and other objects and advantages of the invention will appear more clearly from the following specification in connection with the accompanying drawings, in which:

FIG. 1 illustrates a side view of a cable guiding device according to the present invention.

FIG. 2 is a top view of the arrangement of FIG. 1.

FIG. 3 illustrates a transverse section through FIG. 1, said section being taken along the line III—III of FIG. 1.

FIG. 4 is a section of the link chain employed in connection with the arrangement of FIG. 1, but on a larger scale than that of FIG. 1.

FIG. 5 is a section taken along the line V—V of FIG. 4.

FIG. 6 is a bottom view of FIG. 4.

FIG. 7 is a transverse section of the entire device in its guiding channel.

FIG. 8 is a section through the entire device similar to that of FIG. 7 but slightly modified thereover inasmuch as the guiding channel is sunk in.

*General arrangement*

The present invention is characterized primarily in that the device is made of a simple link band adapted to be bent in one direction and composed of inter-engaging links and link members. One of said elements each has one or more cable holders connected thereto, and at least some of said links or link members have conected thereto runner rollers known per se. In this way, a guiding device is obtained which is displaceable on a plane support and in the maner of a self-supporting chain can be bent in one direction but not in the opposite direction.

According to a practical embodiment of the present invention, the links have lateral flanges or webs partially embracing the link members which have rounded ends. One of said webs extends beyond the respective pivot points of the two band portions and thus prevents the band portions from bending in this direction, whereas the other web approximately at the level of the pivot points or pivot axes tapers outwardly so that a tilting of the parts in this outward direction will be possible. However, these tapering portions will limit the bending radius of the device. The slanted portions are such that the cables, hoses or the like cannot be bent at the deviating portion of the guiding arrangement.

Advantageously, each link member is reinforced by a pulling link adapted to be tilted by means of said link members, said pulling links being linked to the link members at the same pivot points. Transversely extending supporting yokes for holding the cable holder, running rollers and slide band are connected to the link members, said yokes having for instance U-shaped cross section. These supporting yokes, preferably the top and bottom sides thereof have cable holders arranged thereon so that the space between the runing rollers may be taken care of for guiding cables or the like whereby the entire device will not become too high, especially when a plurality of cables have to be arranged one above the other. At least those cable holders which are arranged on the top side are adapted to be tilted off so that the cables can easily be placed into the guiding device or be removed therefrom. The cables are best clamped fast into the holders so that they will not have to convey any pulling forces.

The entire cable guiding device is preferably guided in a guiding channel or the like without additional links. Thils channel may be arranged either on the rounded web laterally of the crane rail or may be mounted on supports laterally connected to the lower end of the support for the crane rails.

*Structural arrangement*

Referring now to the drawings in detail, the guiding device illustrated therein comprises a link chain 1 including links 2 and link members 3 linked thereto and also including pulling links 4. The pivotal connection is formed by rivets 6 extending through bushings 5. The ends of the links 2 are arranged between the ends of the link members 3 and pulling links 4 (FIG. 4). Each link 2 is laterally provided with webs or flanges 7, 8 which extend beyond the rounded ends of the adjacent link members 3. The arrangement is such that one flange 7 extends beyond the two rivets 6 serving as pivots, whereas the other flange 8 ends approximately at the level of said pivots and has its ends 8a tapered outwardly. As a result thereof, the link members 3 and thus also the pulling links 4 can be tilted relative to the link 2 only in the direction toward the shorter flange 8. The design of the tapers 8a determines the bending radius of the entire device (see FIG. 6 left-hand side).

The top side of each link 2 and, more specifically, the central portion thereof has connected thereto a U-shaped transversely extending supporting yoke 9 the legs 9a and 9b of which extend downwardly. Mounted on the top side of said yoke 9 is a cable holder 10, 10a hinged together by hinge pin 11 so that the cable holder portion 10 may be tilted laterally about said hinge pin 11. Said cable holder 10, 10a when in its closing position, is by means of a bolt 12 and bent hook-shaped ends 13, held on a cable support 14. Hinge pin 11 and cable support 14 are held on supporting yoke 9 (FIG. 3) at opposite sides by means of a screw connection 15. By means of the said screw connection, a singly bent further cable holder 16 and bearing yoke 17 for running rollers 18 are connected to the bottom side of said supporting yoke 9. However, the rollers 18 are in conformity with the showing of FIGS. 1 and 2, preferably arranged only at every other supporting yoke 9 inasmuch as this is completely sufficient.

The upper cable holder 10 retains and clamps three cables 19, 20, and 21 against the cable suport 14, so that the members 10 and 14 form supporting means for the three cables. These cables are the phases R, S and T of the non-illustrated crane motor, whereas the cable 22 supported by the lower cable holder 16 illustrates the netural conductor O. If at a traction of 500 meters, for instance cables of a cross section of 95 square millimeters are employed, it will be possible continuously to transmit a power of 300 H.P.

The entire device for guiding cables is arranged in a guiding channel 23 of U-shaped cross section open at the top, while the side walls of said channel extend beyond the supporting yokes 9. No additional guiding rails or the like are required in this channel. The guiding channel 23 (FIG. 7) may, for instance, be arranged on the grated web 24 laterally adjacent a crane rail 25. However, if desired, the guiding channel may also be arranged in sunk-in condition adjacent the rail 25 in which instance said guiding channel may be supported by supports 26 which are connected to the lower ends of the girder 27 for the running rail 25 (FIG. 8).

Each supporting yoke has laterally connected to one leg 9b a sliding band 28. With large displacement strokes or tracks for which the above mentioned guiding device is intended, the link band 1 requires an additional guiding means in order to be sure that it will always be held straight. These guiding means are formed by the channel 23 inasmuch as the supporting yokes may, if desired, slide on the side walls of said channel 23 whereby the device will again be pressed into the desired direction.

In order to avoid frictional differences during the starting phase, the outside of the supporting yoke 9 has connected thereto the sliding band 28 cooperating with the side walls of the guiding channel 23. Said band 28 consists of wear-resistant synthetic material or the like as for instance, nylon. This will among others also avoid an undesired sparking.

The length of the link band 28 between two suspension points must be so great that it will not interfere with the deviation of the link chain. When the device is in ts stretched-out condition, the link band will, due to its longer length, be serpentine-shaped (FIG. 2). Instead of the link band 28, also synthetic bosses 29 (FIG. 7) or rollers or the like may be connected to the legs 9b of the suporting yoke 9.

As will be evident from the above, the present invention yields a device which is particularly suitable to replace the main loop guiding system of displaceable cranes or the like with their complicated covers. With the arrangement according to the present invention, it is not necessary to cover the cable guiding means, and furthermore, the arrangement according to the invention may be employed in halls or chambers which are not protected against explosions. As the guiding chanel is arranged in sunk-in condition adjacent one of the crane rails, it will not be necessary to provide as deep a channel as is necessary with heretofore known loop guiding means.

What we claim is:

1. An arrangement for supporting and guiding flexible linear elements between a stationary connection and a movable consumer, which comprises chain means in the form of a row of a plurality of links linearly arranged and connected by vertical pivots lying along the center line of said chain means, a plurality of rollers supporting said chain means for movement over a horizontal surface and connected to said links, and a plurality of supporting means each carried by one of said links for supporting a plurality of said flexible elements with their axes lying in the same vertical surface as said center line, each of said supporting means comprising a support for said plurality of flexible elements on top of said one of said links, and a retaining and clamping member formed to embrace and clamp a plurality of said flexible elements arranged one above the other on said support with their axes in the same vertical surface as said center line, said retaining and clamping member being movable to release said flexible elements so that said flexible elements may be removed from said chain means.

2. The arrangement in claim 1, in which said chain means may be deflected from a straight line in one direction to allow said flexible elements to move on a curve, said chain means having a flexible strip mounted on the outer side to act as a guide means for said chain means, said flexible strip being longer than the straight line length of said chain means to conform to the greater length of the outer side on said curve.

3. The arrangement in claim 4, in which said retaining member is hinged so that it may be moved about a pivot to release said flexible elements.

4. An arrangement for supporting and guiding flexible linear elements between a stationary connection and a movable consumer, which comprises chain means in the form of a row of a plurality of links linearly arranged and connected by vertical pivots lying along the center line of said chain means, a plurality of pairs of transversely spaced rollers mounted beneath said links on opposite sides of said center line and supporting said chain means for movement over a horizontal surface, a plurality of supporting means each carried by one of said links for supporting a plurality of said flexible elements with their axes lying in the same vertical surface as said center line, each of said supporting means comprising a support for said plurality of flexible elements on top of said one of said links, and a retaining member formed to embrace and retain a plurality of said flexible elements on said support arranged one above the other with their axes lying in the same vertical surface as said center line, said retaining member being movable to release said flexible elements so that said flexible elements may be removed from said chain means, and supporting means on the under side of said chain comprising a plurality of supports each fixed to the under side of one of said links and supporting a cable beneath said chain means with its axis in said vertical surface of said center line and between the transversely spaced rollers of said pairs of rollers.

References Cited by the Examiner

UNITED STATES PATENTS

| 2,374,267 | 4/1945  | Berg et al. | 198—189 |
| 2,864,907 | 12/1958 | Waninger    | 191—12  |
| 2,975,807 | 3/1961  | Waninger    | 191—12 X |
| 3,011,492 | 12/1961 | Humbert     | 59—78.1 X |
| 3,020,362 | 2/1962  | Waninger    | 191—12  |

FOREIGN PATENTS

| 725,156 | 3/1955 | Great Britain. |
| 86,631  | 6/1936 | Sweden. |

OTHER REFERENCES

Waninger, German application 1,082,644, printed June 2, 1960 (Kl. 21C 19/06).

ARTHUR L. LA POINT, *Primary Examiner.*

JAMES S. SHANK, EUGENE G. BOTZ, *Examiners.*